No. 863,722. PATENTED AUG. 20, 1907.
A. E. KELLY.
DOUGH KNEADING MACHINE.
APPLICATION FILED JULY 23, 1906.
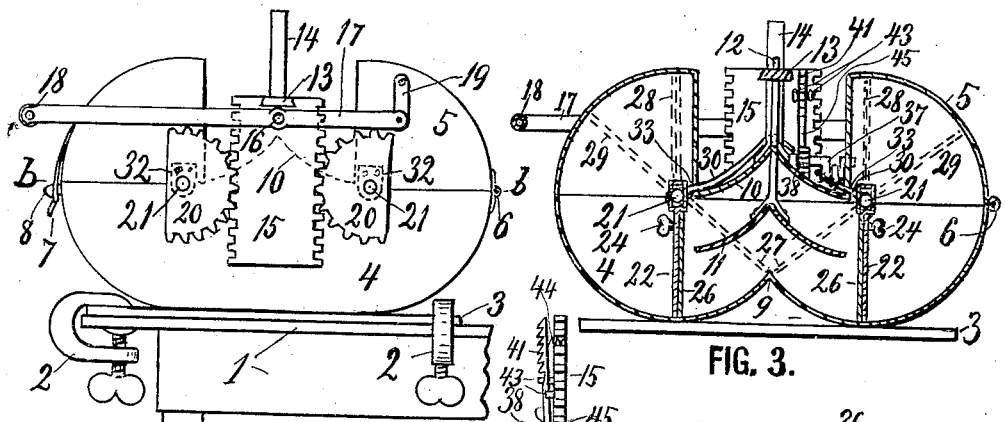
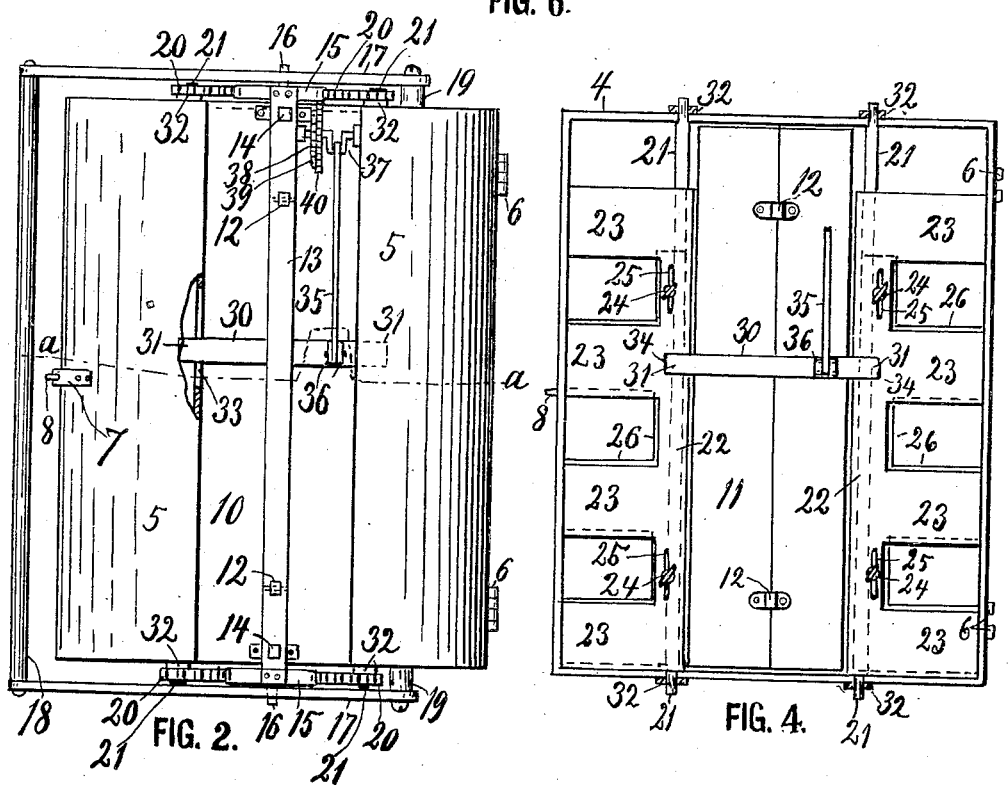
WITNESSES:
L. E. Carlsen.
D. E. Carlsen.
INVENTOR:
Alice E. Kelly.
By her ATTORNEY:
A. M. Carlsen.

UNITED STATES PATENT OFFICE.

ALICE E. KELLY, OF MANKATO, MINNESOTA.

DOUGH-KNEADING MACHINE.

No. 863,722.  Specification of Letters Patent.  Patented Aug. 20, 1907.

Application filed July 23, 1906. Serial No. 327,337.

*To all whom it may concern:*

Be it known that I, ALICE E. KELLY, a citizen of the United States, residing at Mankato, in the county of Blue Earth and State of Minnesota, have invented certain new and useful Improvements in Dough-Kneading Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to dough-kneading-machines, especially of the class operated by hand power for domestic use, but it may also be used in bakeries and operated by steam or other power; and the object is to provide a cheap durable and effective machine of said class, in which the kneading is done on the same principle as kneading by the hands. This and other objects I attain by the novel construction and arrangement of parts illustrated in the accompanying drawing in which—

Figure 1 is an end elevation of my kneading-machine secured upon the corner of a table. Fig. 2 is a top or plan view of the machine. Fig. 3 is a cross section on the line $aa$ in Fig. 2 with modification of the mechanism that turns the crank seen in the upper end of Fig. 2, and the shafts 21 not intersected. Fig. 4 is a sectional view on the line $bb$ in Fig. 1, with all operating mechanism removed except the members working directly on the dough and a portion of the mechanism by which two of said members are slid into different positions while working. Fig. 5 is a detail view of the yoke 30 in Figs. 2, 3 and 4. Fig. 6 is a detail rear side elevation of the modified parts in Fig. 3.

Referring to the drawing by reference numerals, 1 designates a table upon which is secured by screw clamps 2 the base 3, which is permanently fixed to the bottom of the pan or receptacle 4 in which the dough is kneaded. Said pan is provided with a cover 5 hinged at 6 and held closed by a spring-arm 7 having a hole adapted to go upon a catch 8 at the front edge of the pan.

As will be best seen in Fig. 3, the front and back part of the pan form, together with the adjoining parts of the cover, two spaces or chambers, each of which is about three-fourths of a cylinder and overlap slightly one another, whereby the lower parts of the cylinders form an upward ridge or bulge 9 in the bottom of the pan, while the middle portion or bridge 10 of the cover form a substantially parallel plane to said bulge. Between said bulged parts is a similarly bulged dough-pressing plate 11, which is reciprocated vertically by its arms 12 so as to press upon the dough, said arms being extended upwardly through the parts 10 of the cover and fixed in a longitudinal bar 13, which moves vertically on guiding posts 14 fixed on the cover, and has its ends secured in two vertically moving double-edged racks 15, which are pivoted at 16 to the arms 17 of a U-shaped hand-lever 17—18, whose ends are pivoted by links 19 to the ends of the cover, the links serving to permit linear movement of the racks.

At the ends of the machine the racks 15 oscillate two mutilated gears 20, fixed on the ends of two parallel rock-shafts 21, journaled in hangers 32 fixed on the cover. Upon flattened portions of said shafts are slidingly mounted within the pan two flat dough-workers or hands 22, each formed with a series of flat fingers 23 and having secured upon it by thumb-screws 24, inserted through slots 25, a slidable plate or hand 26, the sliding adjustment of which will reduce or even close the openings between the fingers 23, as may be desirable in working dough of different consistency.

From the above it will be understood that when the handle 18 is moved up and down the racks 15 will cause the hands or members 22—23 to oscillate between the positions 27 and 28, and that every time the hands spread outward and upward the plate 11 descends and presses the dough down and outward from both sides of the ridge 9, whereupon the hands or fingers 23 come down again and the plate 11 ascends, so that the plate 11 and the hands 22—23 alternately gather and spread the dough and thereby knead it. As the wings or hands 22—23 work in said manner they are at each stroke changed or moved on their shafts about as much as the width of one of the fingers 23, so that the hands work alternately every other stroke in each end of the pan. This movement is caused by a mechanism which comprises a yoke bar 30, whose ends 31 extend through slots 33 in the cover and embrace and slide on the shafts 21 in notches 34 in the hands, which are thus moved when the yoke moves, which is done by a pitman 35 having one end pivoted between lugs 36 on the yoke and the other end operated by a crank-shaft 37 journaled to the cover and turned by a ratchet wheel 38 fixed thereon, and given one-half of a turn so as to throw the crank alternately toward each end of the machine every time the hands 22 are out of the dough, that is, while they are between the positions 28 and 29 in Fig. 3. Such half turn of the crank and ratchet wheel may be obtained by various mechanisms of which I have only illustrated, as examples of many more, the following two:

In Fig. 2 the ratchet wheel is turned by a dog 39 pivoted on a gear wheel 40, which is oscillated by the teeth of one edge of the adjacent rack 15, or extra teeth (not shown) provided for that special purpose on the member 15 and engaging the gear wheel during the last part of the descent of the member; but I prefer the form shown in Fig. 3 and 6, where the ratchet wheel is at the proper time given the half stroke or turn by means of a ratchet rack 41 pivoted at 42 with its lower end to the rack 15, on which it is guided between studs 43 and is held in contact with the wheel by a light spring 44. By this arrangement the descent of the members 15 and 41 impart half a turn to the ratchet wheel and crank at the last part of the descent of the hand-lever; and when the lever 15 ascends the ratchet rack 41 plays over the teeth of the ratchet wheel during the first part of the ascent, during the greater part of the ascent and first part of the descent the smooth part 45 of the ratchet rack slides on the ratchet wheel without turning it, a spring-dog 42× holding the wheel still at each half stroke.

It will be understood that the hands or wings 22 fit so snugly the curves of the pan and alternately the ends of it as to gather automatically and work all the dough during operation. Also the ends of the presser-plate 11 fit snugly to the ends of the pan, while the longitudinal edges of it helps to gather the dough from the fingers 23 and then spread it out into both sides of the pan by pressing on it.

The cover of the machine is opened only when it is necessary for setting the dough, mixing in flour, or similar purposes, but otherwise it should be kept closed both during the raising and the kneading of the dough, as both will help to maintain the properly warm temperature to the dough.

Having thus described my invention, what I claim, a d desire to secure by Letters Patent, is:—

1. A dough-kneading machine comprising a pan and cover hinged thereto and provided with means for holding it closed, said pan and cover forming two parallel substantially semi-cylindrical adjoining chambers, a pair of rock shafts extending centrally through said chambers, dough-kneading plates or hands mounted on said shafts and adapted to swing to and from each other, a hand lever pivoted to the machine and operatively connected with said shafts to cause them to rock in unison in opposite directions said hands having flat fingers with intervening spaces.

2. A dough-kneading machine comprising a pan and cover hinged thereto and provided with means for holding it closed, said pan and cover forming two parallel substantially semi-cylindrical adjoining chambers, a pair of rock-shafts extending centrally through said chambers, dough-kneading plates or hands mounted on said shafts and adapted to swing to and from each other, a hand lever pivoted to the machine and operatively connected with said shafts to cause them to rock in unison in opposite directions, said hands having flat fingers with intervening spaces, and a presser plate pressing downward upon the dough every time the kneading hands spread.

3. A dough-kneading machine comprising a pan and cover hinged thereto and provided with means for holding it closed, said pan and cover forming two parallel substantially semi-cylindrical adjoining chambers, a pair of rock-shafts extending centrally through said chambers, dough-kneading plates or hands mounted on said shafts and adapted to swing to and from each other, a hand lever pivoted to the machine and operatively connected with said shafts to cause them to rock in unison in opposite directions, said hands having flat fingers with intervening spaces, and sliding adjustable members with fingers adapted to cover more or less the spaces between the fingers of the main hands.

4. A dough-kneading machine having a pair of parallel rock shafts, a dough-working hand or plate with fingers slidingly mounted on each of said shafts so as to rock with the shafts, gears at the ends of the shafts, toothed reciprocating members between said gears for rocking the hands, a hand-lever pivoted to the machine and operating the reciprocating members, and means operated from said lever whereby the dough-working hands are automatically slid toward opposite ends of the shafts alternately at every stroke of the lever.

5. A dough-kneading machine having a pan with a longitudinal central bulge or ridge upon its bottom, a vertically reciprocating presser plate shaped after said ridge, and oscillating dough-working members arranged to gather the dough vertically below said plate when it is elevated.

In testimony whereof I affix my signature, in presence of two witnesses.

ALICE E. KELLY.

Witnesses:
A. R. PFAU,
A. R. PFAU, Jr.